Figure 2:
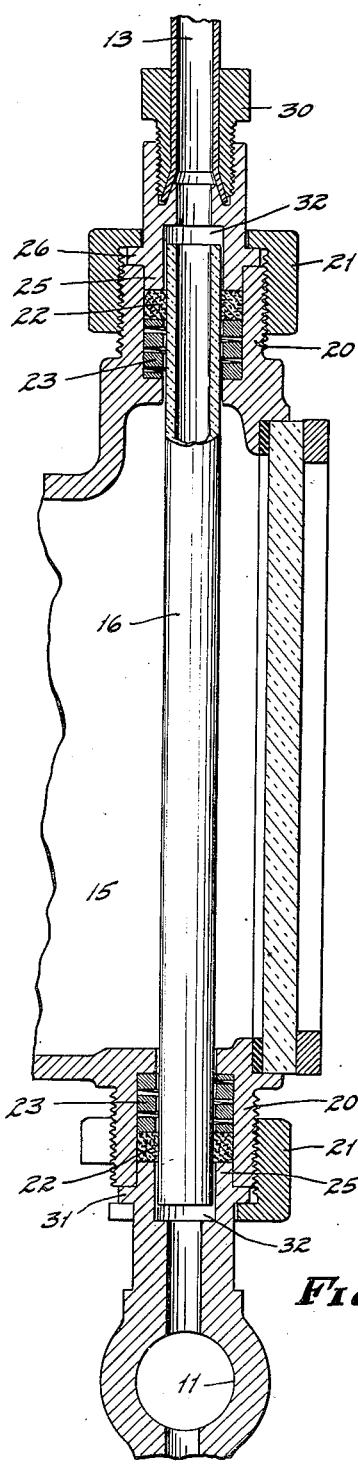

June 15, 1937.                F. M. ROBY                 2,083,794
                          GAUGE GLASS PACKING
                          Filed June 12, 1935

INVENTOR.
Frank M. Roby
BY Bates, Golrick, & Teare
ATTORNEYS

Patented June 15, 1937

2,083,794

UNITED STATES PATENT OFFICE 2,083,794

GAUGE GLASS PACKING

Frank M. Roby, Shaker Heights, Ohio

Application June 12, 1935, Serial No. 26,151

5 Claims. (Cl. 73—54)

This invention relates to gauge glasses for steam boilers and particularly to a method of packing a tubular water glass, which is used in such gauges. The packing heretofore used for such purpose has been held in place by a follower which is usually drawn up to a certain degree of tightness by the workman while the gauge is cold, and then further compressed in the event of leakage after the gauge is heated. This procedure is objectionable for the reason that the initial pressure is apt to be too great with the result that glasses frequently crack during the heating operation. This item of breakage has become an appreciable factor in gauge glass maintenance and has necessitated the use of considerable skill and judgment in the initial tightening of the packing nuts.

Tubular water gauge glasses vary in size, particularly in the outside diameter, and also vary at different points around the circumference. The size of the openings through the bottoms of the stuffing boxes and in the compressing members into which the glass projects must obviously be slightly larger than any glass having the largest permissible outside diameter, in order to permit a slight lateral movement of the glass, which may be caused by compressing a gasket, the central hole of which is not exactly in alignment with the stuffing box wall. These clearance openings in the compression members have a tendency to allow the gasket material to flow under pressure and the difficulty has been to so control the flow that the material will not reach the end of the glass, as an obstruction of the opening in the glass causes the water to show a level different from that in the boiler. The flowing characteristic of gasket material is necessary to insure a leak-proof joint, but the flowing action usually necessitates frequent tightening of the compression members. Where, however, the tightening of the compression members is left to the judgment of the workmen, there is not only an opportunity for misjudgment, but also the probability of sufficient extrusion of the gasket material to require frequent gasket renewal. In practice, the tubular glasses are usually broken in order to expedite gasket removal, and hence, the breakage of glass unnecessarily is greatly increased.

To prevent injury to the operators from broken glass or escaping steam or hot water in case the gauge should burst under pressure, I have devised a steam-tight removable safety glass window through which the water level is visible, and I have also provided an automatic steam-tight connection from the water gauge to the explosion drain pipe, all of which are illustrated in my Patent No. 2,013,448.

In such application, however, the connection between the water conduit and the glass casing includes gasket material upon which the weight of the gauge rests and which is therefore subjected to pounding and vibration while the locomotive is in use. Under an extended period, this gradually expels the gasket material and causes leakage, which necessitates frequent attention to the adjusting member.

An object of my invention is to provide a gasket compressing construction by means of which the extent of gasket compression is not left to the judgment of the workmen. Instead, the workman is permitted to draw down the compression member until it engages a limit stop. My invention then contemplates the provision of means for yieldably compressing the gasket to a predetermined degree, and for maintaining such yieldable force against it at all times.

An additional object of my invention is to provide a connection between the gauge glass casing and the boiler, which insures a metal to metal contact at all times, and thus obviates the necessity for transmitting stresses resulting from the weight of the casing through the gasket material. In this way, I assure a connection which will eliminate the detrimental effects of any pounding or vibration in the best possible manner, and which will eliminate the necessity for adjusting the compression members.

In practice, my invention in the preferred form is carried out by utilizing a spring within the stuffing box, and arranging it to bear against the gasket material. Thus, when the compression member is drawn down against the shoulder, the spring is compressed to a predetermined degree, such degree being insufficient to cause excessive extrusion of the gasket material, and yet being sufficient to avoid leakage at all times during the life of the gasket. In locomotive boiler practice, water glasses are usually reconditioned at predetermined intervals and particularly when the locomotive is removed from service for other causes. The reconditioning interval, however, is usually such that the gasket will remain tight against leakage, even on those gauges on which the packing nuts have been tightened excessively. My invention, therefore, materially lengthens the intervals in which the water gauge must be reconditioned, as excessive extrusion of the gasket material is prevented.

Figure 1:
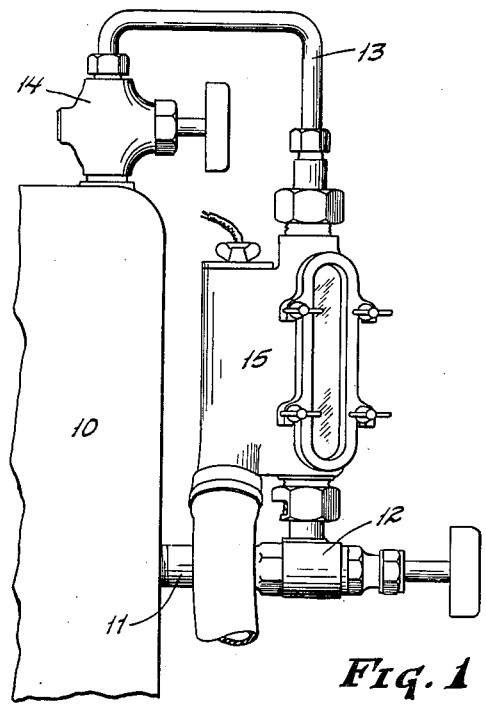
Figure 3:
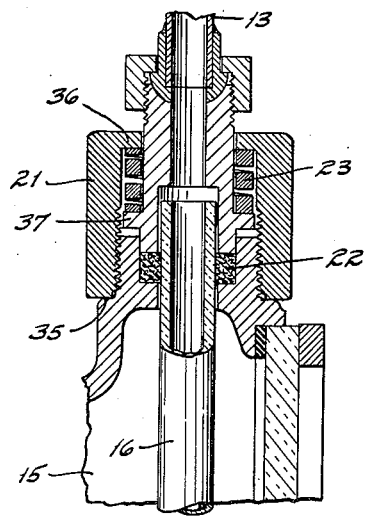

In the drawing, Fig. 1 is a side elevation of a part of a boiler that has a water gauge, embodying my invention, attached thereto; Fig. 2 is a longitudinal section taken on an enlarged scale through the water gauge shown in Fig. 1, and Fig. 3 is a fragmentary sectional view through a gauge showing a modification of my invention.

The boiler with which the water gauge is illustrated is indicated at 10, as having a water conduit 11, leading therefrom and controlled by a valve 12, and as having a steam conduit 13 leading therefrom and controlled by a valve 14. The water gauge casing, indicated at 15, is connected between the water and steam conduits, and as is shown in Fig. 2, comprises a casing having stuffing boxes adjacent each end into which a tubular gauge glass 16 extends.

To pack the gauge glass, I have shown each end of the casing, as having a stuffing box 20, which is exteriorly threaded to receive a nut 21. Within each stuffing box, there is provided a ring gasket 22 that fits snugly against the wall of the glass and against the wall of the box. In Fig. 2, there is shown a spring 23 within each stuffing box and positioned between the inner end of the box and the packing ring. The overall length of the spring when uncompressed, plus the depth of the packing ring is such that the outer face of the packing ring is within the stuffing box before any pressure is placed against the ring. This provides a slight recess into which the packing follower 25 may be inserted prior to the tightening operation.

The packing follower at the upper end of the casing of Fig. 2 has a flange 26, which engages the end of the stuffing box when the nut 21 is tightened. During the tightening operation, the follower compresses the gasket and also the spring 23, so that when the flange 26 engages the end of the stuffing box, the spring is under sufficient compression to make a leakproof joint at all times. The follower 25 has a rigid connection with the conduit 13 by means of the threaded sleeve 30, which engages a correspondingly threaded portion in the outer end of the follower, and thereby forces the flared end of the conduit 13 into engagement with the complementary shaped set within the follower 25. This construction makes a metal to metal contact between the casing and the steam conduit without placing any stresses upon the gasket material, due to the weight of any of the associated component parts of the gauge assembly.

In like manner, the bottom of the casing has a metal to metal contact with the water conduit 11 by reason of the fact that the follower 25 forms part of the valve casing 12 and is provided with a flange 31, which is forced tightly against the end of the lower stuffing box whenever the nut 21 is tightened. The tightened condition of the upper and lower packing nuts is shown in Fig. 2 from which it will be apparent that the casing is connected entirely by a metal to metal contact with the steam and water conduits respectively. At the same time, the gaskets are under compressive pressure at all times. Inexpensive gaskets, which are pliable enough to maintain a leak-proof joint under the permissible variation in the out-of-round, and in the outside diameter of the tubular water glasses, are commercially available, and the extrusion of the gasket material under the compressing action of the springs is slight. However, to prevent such extruded material from reaching the ends of the glass, I have provided shouldered recesses in the inner end of each follower, and into which the ends of the glass extend. These recesses are substantially the same in depth and the depth is such that whenever one end of the glass is in engagement with the shoulder in one of the recesses, the opposite end of the glass extends sufficiently far into the other recess to prevent the extruded material from ever reaching the end of the glass. Ordinarily, the length of the glass projecting beyond the end of the outer faces of the gaskets is maintained approximately equal, as the lengthwise movement of the glass is prevented, by alternately tightening one packing nut and then the other for a part of a turn, and for an equal amount, during the assembly operation.

In Fig. 3, I have shown a modification of my invention, wherein the spring 23 is placed outside the stuffing box and around the follower instead of inside the stuffing box, as is shown in Fig. 2. The packing nut 21 is drawn downwardly until it engages a shoulder 35 on the stuffing box, at which time the spring is compressed to a predetermined degree and exerts pressure against the flange 37 of the follower to compress the packing. The flange remains out of contact with the ends of the stuffing box, wherefore, the packing is maintained under sufficiently yielding pressure to maintain automatically a leak-proof joint during its entire allowable period of use.

The springs, which I prefer to use are made of square spring wire and are ground flat on each end. When they are used, as shown in Fig. 2, they have a snug fit within the stuffing boxes and have an internal diameter, which is slightly larger than the outside diameter of the tubular glass. Such clearance is sufficient to prevent the spring from touching the glass, and also prevents the gasket material from being squeezed to any harmful degree between the glass and the spring.

I claim:

1. In a water gauge having a tubular gauge glass, a casing therefor, the casing having a stuffing box surrounding the glass adjacent one end thereof, and having packing material therein for engaging the glass and holding it centrally within the box, a member removably attached to the casing and in abutting engagement therewith for exerting a predetermined degree of pressure initially against the packing, and a spring for exerting additional pressure against the packing, the strength and size of the spring with relation to the packing being such that the maximum pressure which may be exerted against the packing is limited to an amount which will not break the gauge glass.

2. In a water gauge having a tubular gauge glass, a casing therefor, the casing having a stuffing box surrounding the glass, packing material within the stuffing box, a packing follower having a projection therein adapted to engage the casing for limiting the pressure that may be exerted against the packing, a spring for maintaining a yieldable pressure against the packing and means for holding the follower and spring in assembled relationship with reference to the casing.

3. In a water gauge having a tubular gauge glass, a casing therefor, fluid conduits connected to the casing, stuffing boxes associated with the casing and surrounding the ends of the glass, packing material within each stuffing box, springs acting on the packing to maintain yieldable pressure thereagainst, followers, each having a projection thereon for engaging the casing and limiting the initial pressure that may be exerted against the packing, each follower having a passageway therein providing communication between the gauge glass and the fluid conduits, and means for removably holding the followers, conduits and casing in assembled relationship with the projections on the followers at all times in abutting engagement with the casing.

4. In a water gauge having a tubular gauge glass, a casing therefor, a stuffing box surrounding the glass and forming a part of the casing, packing material within the box and surrounding the glass, a follower engaging the packing and having a projection thereon for engaging the casing to limit the compression of the packing, a nut adapted to engage the projection on the follower and to removably lock it against the casing, and a spring within the stuffing box and acting against the packing for maintaining a yieldable pressure against the packing after the follower has been locked in position against the casing, the strength and size of the spring with relation to the packing being such that the maximum pressure which can be exerted against the packing is limited to an amount that will not break a normal glass.

5. In a water gauge having a tubular gauge glass, a casing therefor, said casing having a stuffing box surrounding the glass and having packing material therein for engaging the glass and holding it in central position within the box, a follower having a projection thereon, a spring surrounding the follower and adapted to engage the projection, a packing nut enclosing the spring and removably connected to the casing, the size of the packing being such that the projection on the follower is held out of engagement with the end of the casing initially, and a spring acting on the packing to maintain a yieldable pressure thereagainst until the projection on the follower engages the end of the casing.

FRANK M. ROBY.